United States Patent Office 3,408,913
Patented Nov. 5, 1968

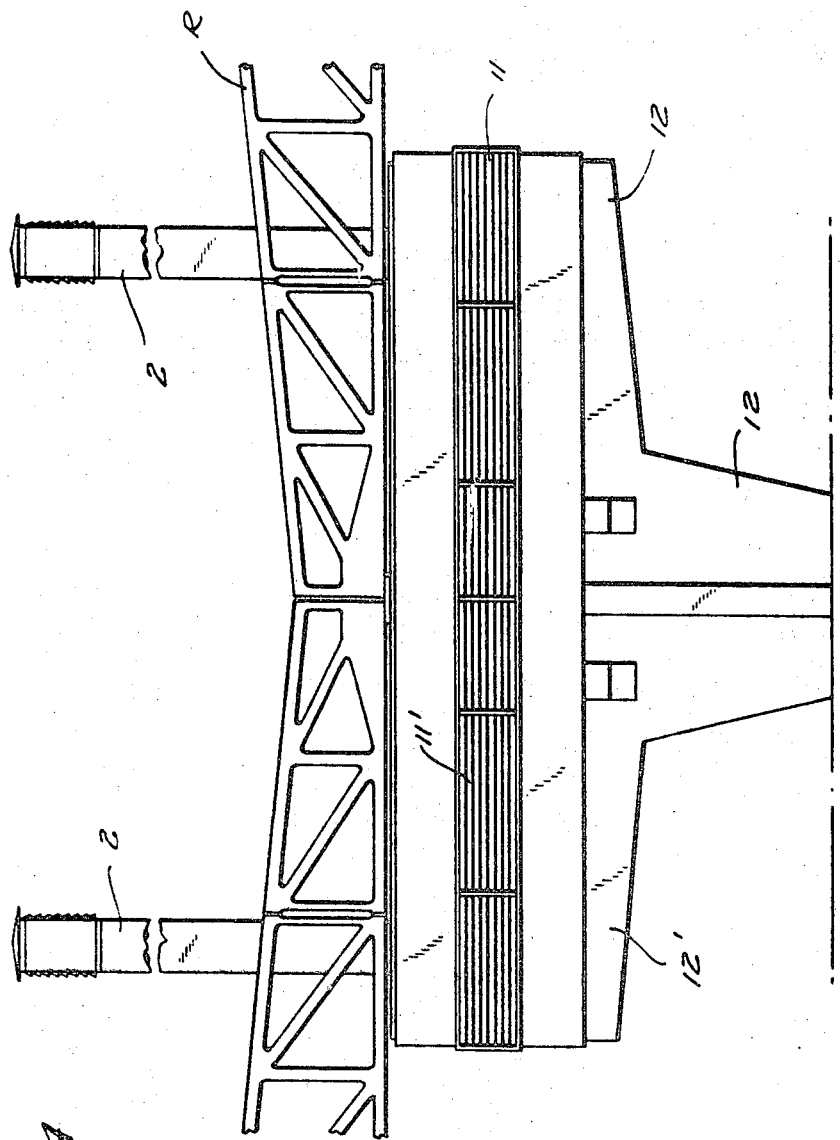

3,408,913
AIR-CONDITIONING ARRANGEMENT FOR HIGH INDUSTRIAL HALLS OF LARGE OPEN AREA
Herbert Kueffner and Franz Carlsohn, Jena, Thuringia, Germany, assignors to VEB Industrieprojektierung Jena, Jena, Germany
Filed Feb. 20, 1967, Ser. No. 617,241
11 Claims. (Cl. 98—30)

ABSTRACT OF THE DISCLOSURE

An air-conditioning arrangement for high industrial halls of large open area including chamber means supported adjacent the roof of the industrial hall, air distributing passage means extending peripherally about the chamber means, air suction means in the chamber means for sucking air from the outer atmosphere through a suction passage extending through the roof of the hall and communicating with the chamber means and for discharging the air into the air-distributing passage, air-conditioning means located in the chamber means in the path of air flowing from the suction passage into the air distributing passage, and air flow guide means in openings of the outer wall of the air distributing passage.

Background of the invention

The present invention relates to an air-conditioning arrangement for high industrial halls with large open area.

Modern practice requires proper air conditioning of industrial halls in order to increase the efficiency of the operating personnel and in order to insure a substantially uniform climate in the interior of the hall independent of climatic changes in the outer atmosphere.

Proper air conditioning of high industrial halls of a large open area is connected with considerable difficulties. Air-conditioning arrangements are known in the art which include a central air-conditioning plant and duct means extending through the hall and having various branches communicating at spaced portions thereof with the interior of the hall so that cooled or heated air may be transmitted through the duct means from the air-conditioning plant to various portions of the hall. Due to the duct means necessary with this arrangement, the aforementioned arrangement is expensive to manufacture and the duct means occupy also considerable space and are sometimes in the way of other apparatus to be mounted in the hall. Other air-conditioning arrangements for large industrial halls are also known in which a plurality of separate air-conditioning units are placed spaced from each other along the walls of the hall. This arrangement is also rather expensive and the control of the plurality of separate air-conditioning units to assure a substantially uniform climate in the interior of the hall independent from outer weather conditions is extremely difficult.

It is an object of the present invention to provide for an air-conditioning arrangement for high industrial halls of large open area which avoids the disadvantages of the above-mentioned air-conditioning arrangements known in the art.

It is an additional object of the present invention to provide for an air-conditioning arrangement for high industrial halls of large open area which does not need extensive duct means for distributing the conditioned air from a central air-conditioning plant throughout the hall.

It is a further object of the present invention to provide for an air-conditioning arrangement which includes only a single unit so that control thereof is simplified.

Summary of the invention

An air-conditioning arrangement for high industrial halls of large open area mainly comprising chamber means, support means supporting the chamber means adjacent the roof of the hall, suction passage means extending through the roof and communicating at the outer end with the outer atmosphere and at the inner and with the aforementioned chamber means, air distributing passage means extending about the chamber means and having an outer peripheral wall formed with openings therethrough, air suction means in the chamber means for sucking air from the outer atmosphere through the suction passage means and for discharging the air into the air distributing passage means, air-conditioning means located in the chamber means in the path of air flowing from the suction passage means into the air-distributing passage means, and air flow guide means in the openings of the outer wall of the air distributing passage means.

The support means preferably include a column supporting the chamber means on the floor of the hall and adjacent to the roof thereof. Preferably the column and the walls of the chamber means are formed of reinforced concrete. The column is preferably hollow and constructed to provide access to the interior of the chamber means through the column.

The suction passage means preferably includes a pair of substantially vertical suction passages communicating at the inner ends with the chamber means in the region of opposite ends of the latter. Adjustable flap means may be provided in each of the suction passages for regulating flow of air therethrough.

The air suction means preferably include a pair of turboventilators arranged in the region of the center of the chamber means and having each a suction end and a flaring outlet end. The outlet ends of the pair of turboventilators are preferably directed away from each other and communicate with diametrically opposite portions of the air-distributing passage means. The air-conditioning means may include air filter means and air-moistening means located between the respective inner ends of the air suction passages and the respective suction ends of the turboventilators, and heat transfer means located at the outlet end of at least one of the turboventilators.

The air-conditioning arrangement according to the present invention has many advantages over air-conditioning arrangements for high industrial halls of large areas known in the art. Since extended air-distributing ducts are unnecessary with the present arrangement, the manufacturing and maintenance cost thereof is considerably reduced. Furthermore, the air-conditioning arrangement of the present invention lends itself to a standardization which makes the mass-production thereof and re-use of an air-conditioning arrangement at another location without special adaption thereof possible. In view of the mounting of the air-conditioning unit adjacent the ceiling of the hall a perfect air conditioning of a large hall is possible without creating undue draft conditions, and furthermore, the air-conditioning unit of the present invention requires very little space.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 4 is a front view of the air-conditioning arrangement according to the present invention.

*Description of the preferred embodiment*

Figure 1:
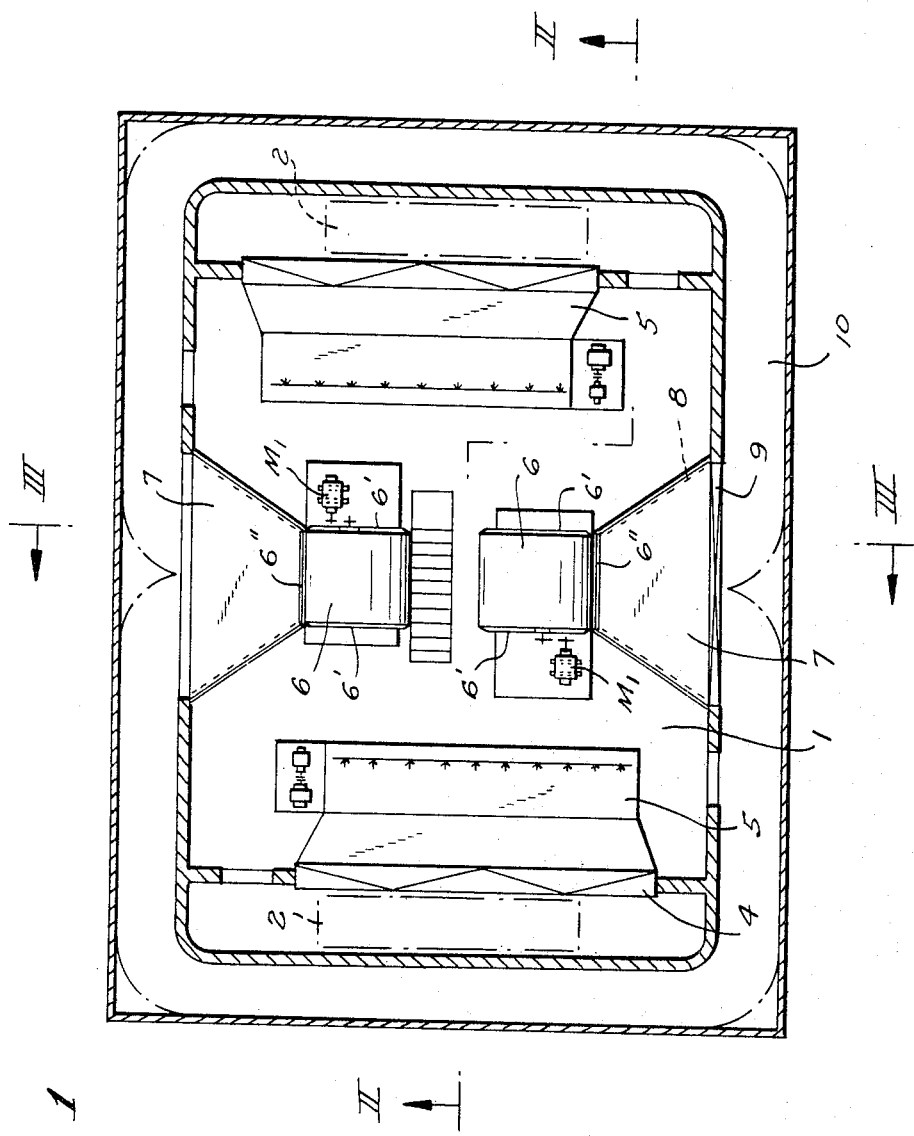
FIG. 1 is a horizontal cross-section taken along the line I—I of FIG. 2.
Figure 5:
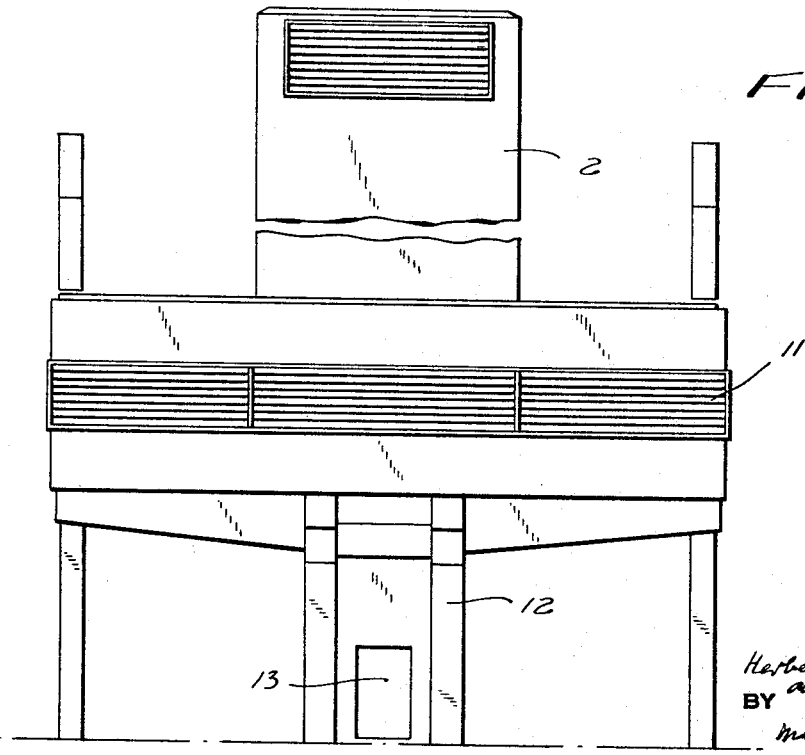
FIG. 5 is a side view thereof.

Referring now to the drawings, it will be seen that the air-conditioning arrangement according to the present invention mainly comprises substantially closed chamber means 1 supported on support means 12 adjacent the roof R of a high industrial hall of large area. The support means 12 are preferably in form of a hollow column provided with a door 13 and an inner staircase schematically illustrated in FIG. 1, so that access to the interior of the chamber means 1 can be had through the hollow column 12. The hollow column 12 and the upper cantilever portions 12' thereof and at least part of the walls which define the chamber means 1 are preferably integrally formed from reinforced concrete. The chamber means 1 has in a horizontal plane preferably a substantially rectangular cross section and an air-distributing passage 10 of substantially the same height as the chamber means 1 extends about the peripheral outer wall of the latter. The outer wall of the air-distributing passage 10 is formed with a plurality of closely adjacent openings 11' in which air flow guide means 11 in form of adjustable louvers are located, which louvers form substantially a continuous strip, as best shown in FIGS. 4 and 5. Suction passage means preferably in the form of a pair of substantially vertical suction passages 2 extend through the roof R of the hall and communicate at the outer ends thereof with the outer atmosphere and at the inner ends thereof with the interior of the chamber means 1 substantially in the region of opposite ends of the latter.

The arrangement includes further air suction means 6, preferably in the form of a pair of turboventilators located adjacent each other substantially in the center of the chamber means 1 and each driven by a motor $M_1$ and transmission means of any standard construction. Each of the turboventilators 6 has a pair of opposite inlet openings or suction ends 6', respectively directed toward the inner ends of the suction passages 2 and an outlet end 6". The outlet ends 6" of the pair of turboventilators 6 are directed away from each other and communicate through flaring air passages 7 with diametrically opposite portions of the air-distributing passage 10. Plates 8 of sound-absorbing material preferably cover the inner surface of the air passages 7.

Air-conditioning means are located in the chamber means 1 in the path of air flowing from the suction passages 2 into the air-distributing passage 10. The air-conditioning means may include air filter means 4, preferably in the form of standard oil circulation filters, respectively located adjacent the inner ends of the suction passages 2 and a pair of air moistening means 5 of standard construction and respectively located between the air filter means 4 and the suction ends of the turboventilator 6. The air-conditioning means include further heat transfer means 9 of standard construction located in at least one air passage means 7 through which air from one of the turboventilators 6 flows into the air-distributing passage means 10.

Figure 2:
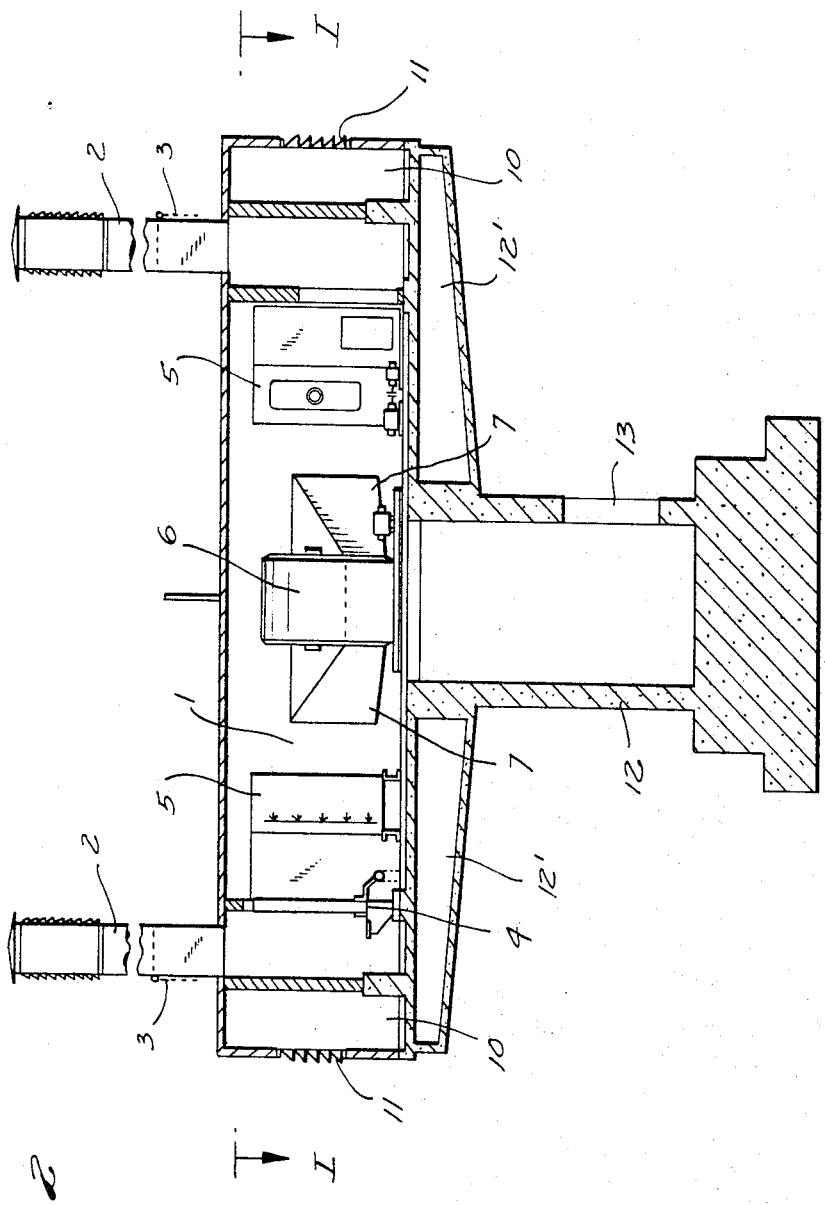
FIG. 2 is a cross-section taken along the line II—II of FIG. 1.
Figure 3:
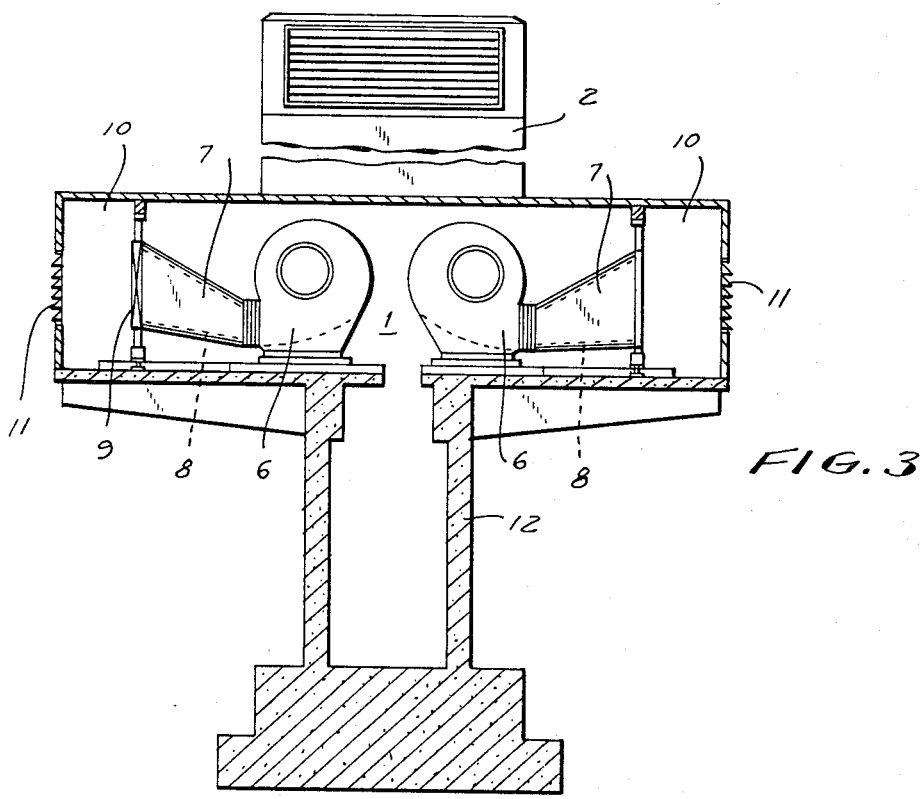
FIG. 3 is a cross-section taken along the line III—III of FIG. 1.

The air-conditioning arrangement according to the present invention will operate as follows:

During operation of the turboventilator 6 air will be sucked through the suction passage means 2 into the interior of the chamber means 1. Thereby the air passes through the air filter means 4 which clean the air from dust particles contained therein and during the subsequent passage of the air through the air-moistening means 5 the temperature of the air is reduced by adiabatically moistening of the same. This cooling is especially necessary during the hot summer months in which the temperature of the hall is considerably increased. The air is sucked through the suction ends 6' into the turbo-ventilator 6 and discharged under presure through the flaring air passages 7 into the air-distributing passage 10 surrounding the chamber means 1. From there the air passes through the adjustable louvers 11 into the interior of the hall whereby the adjustable louvers permit to deflect the air at any desirable angle to the horizontal so that a proper air distribution over the whole area of the hall may be obtained by properly adjusting the louvers. The means for adjusting the louver angle are not shown in the drawing and any standard construction may be used for this purpose. The amount of fresh air sucked into the chamber means 1 through the suction passage means 2, respectively the amount of air to be recirculated within the hall, may be adjusted by a pair of flap valves 3 coordinated with each of the suction passages 2 and each individually adjustable to regulate inlet of fresh air from the outer atmosphere or recirculation of air from the space adjacent the roof R in the interior of the hall through the air-conditioning arrangement. As clearly shown in FIG. 2, one of the flap valves 3 shown by a substantially horizontal dotted line is turnable from the position shown in FIG. 2, in which it prevents flow of fresh air from the outer atmosphere through the respective suction passage into the interior of the chamber means 1, to an inclined position permitting fresh air to pass through the suction passage, whereas the outer flap valve, which is shown by the vertical dotted line, closes in the position shown an opening in the respective suction passage 2 and when turned from its vertical position permits air from the interior of the hall to flow through the opening into the chamber means 1. By adjusting the two flap valves, the amount of fresh air sucked from the outer atmosphere in the chamber means 1 and the amount of air to be recirculated from the interior of the hall can be adjusted. Since during the winter months the amount of fresh air to be sucked from the outer atmosphere will be considerably smaller than during the summer months, it is possible to operate during the cold season only one of the turboventilators 6. Therefore, only one heat transfer means 9 is shown in the illustrated arrangement which cooperates with that turboventilator 6 which will remain in operation during the cold season. Of course, if necessary, a heat transfer means 9 may also be coordinated with the second turboventilator. The means for adjusting the flap valves 3 are not shown in the drawing and any standard construction may be used for this purpose. The means for circulating a heated fluid medium through the heat transfer means 9 are also not shown.

It will be understood that each of the elements described above, or two or more together, may also find a useful application in other types of air-conditioning arrangements differing from the types described above.

While the invention has been illustrated and described as embodied in an air-conditioning arrangement for high industrial halls of large open area, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An air-conditioning arrangement for a high industrial hall of large area having a roof and upright walls, comprising, in combination, chamber means having a bottom wall of predetermined area; column means having a cross-sectional area substantially smaller than said area of said bottom wall of said chamber means, said upright column means supporting said chamber means in the region of said roof of the hall and spaced from said upright walls thereof; suction passage means extending through the roof and communicating at the outer end with the outer atmosphere and at the inner end with the chamber means; air-distributing passage means extending about said chamber means and having an outer peripheral wall formed with openings therethrough; air-suction means in said chamber means for sucking air from the outer atmosphere through said suction passage means and for discharging the air into the air-distributing passage means; air-conditioning means located in the path of air flowing from said suction passage means into said air-distribuitng passage means; and air flow guide means in said openings of said outer wall of said air-distributing passage means for guiding and distributing conditioned air directly from said openings into the air space surrounding said chamber means.

2. An air-conditioning arrangement as defined in claim 1, wherein said support means includes a column supporting said chamber means on the floor of said hall adjacent to the roof thereof.

3. An air-conditioning arrangement as defined in claim 2, wherein said column and the walls of said chamber means are formed from reinforced concrete.

4. An air-conditioning arrangement as defined in claim 3, wherein said column is hollow and constructed to provide access to the interior of said chamber means through said column.

5. An air-conditioning arrangement as defined in claim 4, wherein said column has upper outwardly projecting portions supporting the bottom wall of said chamber means.

6. An air-conditioning arrangement as defined in claim 1, wherein said chamber means has a peripheral wall defining elongated chamber means and said air distributing passage means extending about said peripheral wall of said chamber means.

7. An air-conditioning arrangement as defined in claim 6, wherein said suction passage means includes a pair of substantially vertical suction passages communicating at the inner ends thereof with the chamber means in the region of opposite ends of the latter.

8. An air-conditioning arrangement as defined in claim 7, and including adjustable flap means coordinated with each of said suction passages and constructed and arranged to selectively regulate flow of fresh air from the outer atmosphere and recirculation of air from the interior of the hall through the suction passage.

9. An air-conditioning arrangement as defined in claim 7, wherein said air suction means include a pair of turboventilators arranged in the region of the center of said chamber means and having each a suction end and a flaring outlet end, the outlet ends of said pair of turboventilators are directed away from each other and communicate with diametrically opposite portions of said air-distributing passage means.

10. An air-conditioning arrangement as defined in claim 9, wherein said air-conditioning means include air filter means and air-moistening means located between the respective inner ends of said air passage and the respective suction ends of said turboventilators, and heat transfer means located at the outlet end of at least one of said turboventilators.

11. An air-conditioning arrangement as defined in claim 1, wherein said air flow guide means comprise louvers located in said openings of said outer wall of said air distributing passage means.

References Cited

UNITED STATES PATENTS

| | | | |
|---|---|---|---|
| 1,947,515 | 2/1934 | Blackburn | 52—40 X |
| 2,763,195 | 9/1956 | Caldwell | 98—33 |
| 2,767,639 | 10/1956 | Johnson et al. | 98—33 X |
| 3,267,995 | 8/1966 | Maudlin | 62—259 X |
| 3,270,738 | 9/1966 | Nielsen | 165—53 X |
| 3,342,008 | 9/1967 | Frey | 52—40 X |

ROBERT A. O'LEARY, *Primary Examiner.*

W. E. WAYNER, *Assistant Examiner.*